United States Patent Office 3,550,400
Patented Dec. 29, 1970

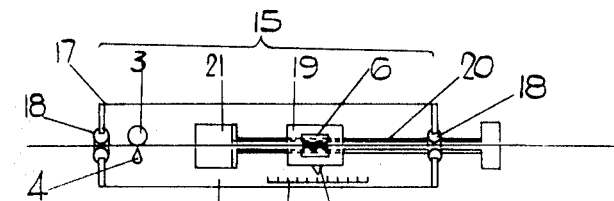
FIG. 5.
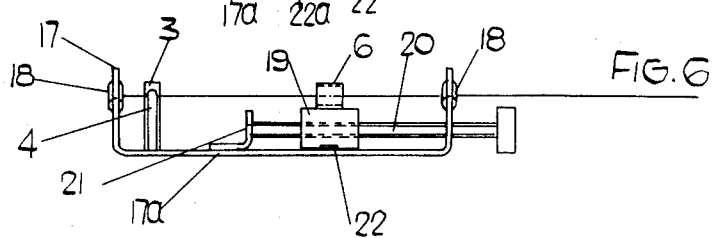
FIG. 6.
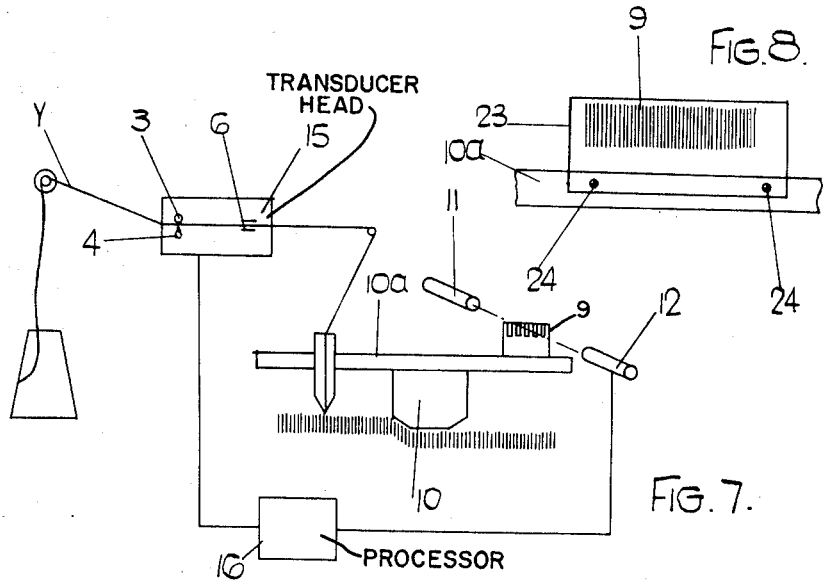
FIG. 7.
FIG. 8.

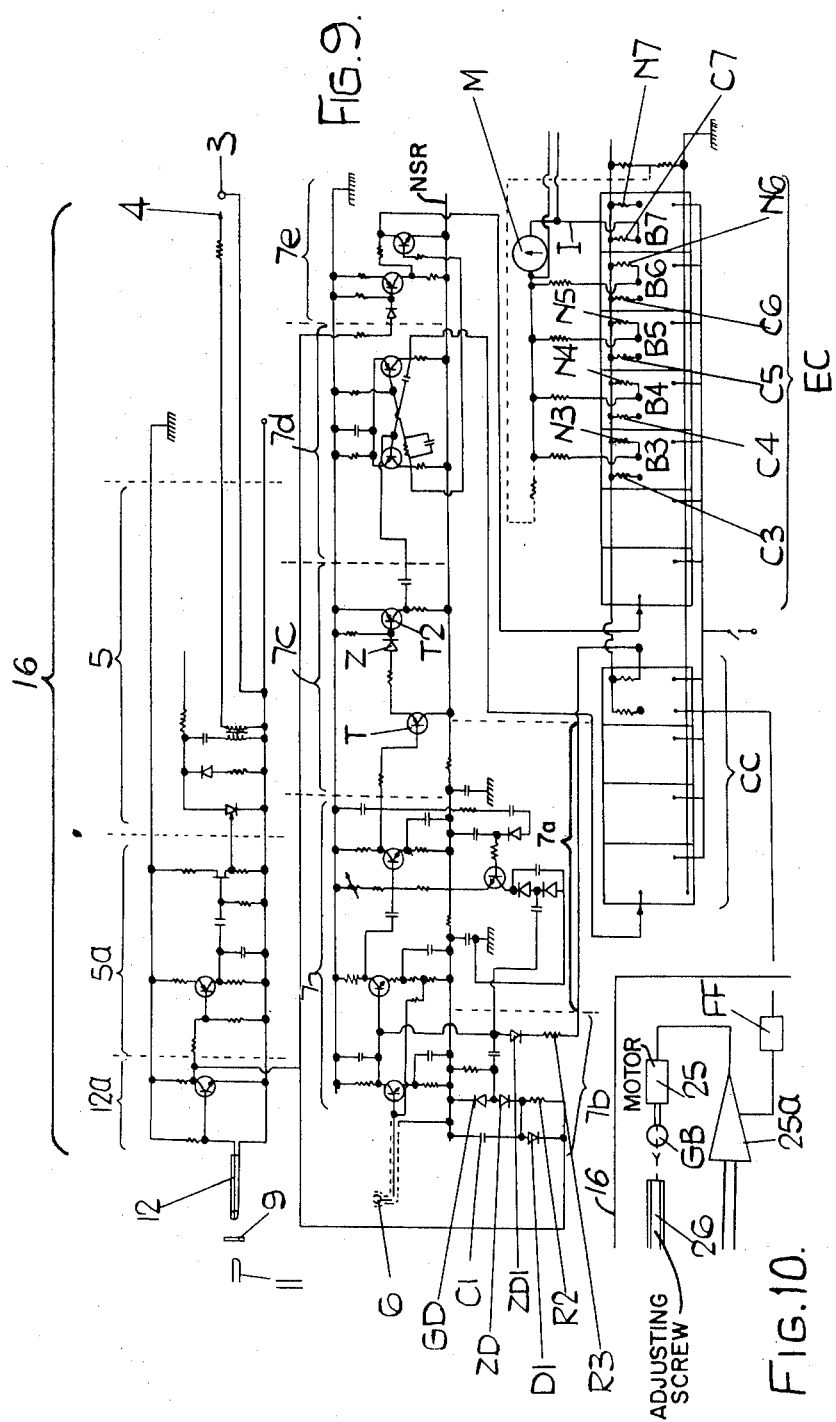

3,550,400
STITCH CONTROL UTILIZING MEANS FOR COUNTING NUMBER OF STITCHES PER UNIT RUNNING LENGTH OF YARN
Derek Peat, Aspley, Nottingham, and Richard William Bicknell Sutton, Woodthorpe, Nottingham, England, assignors to National Research Development Corporation
Filed Feb. 26, 1968, Ser. No. 708,155
Claims priority, application Great Britain, Feb. 28, 1967, 9,323/67
Int. Cl. D04b *11/00;* H01j *39/12*
U.S. Cl. 66—82                                   26 Claims

ABSTRACT OF THE DISCLOSURE

Apparatus for use in a knitting machine, for measuring the number of stitches formed from unit length of yarn or the length of yarn used to make a predetermined number of stitches so that the average stitch length can be determined and if there is a discrepancy between actual and desired stitch length, a correction may be introduced into subsequently formed stitches. The apparatus includes a marking device for putting an electrostatic charge mark on the running yarn, a detector device, at a predetermined distance from the marking device, for detecting the charge mark on the yarn, a graticule traversing with the slurcock across a light beam to a photocell, and electronic circuit for causing correction of stitch length error, indication of stitch length error, or average stitch length.

CROSS REFERENCES TO RELATED APPLICATIONS

Reference is made to British patent application No. 9,323/67 of Feb. 28, 1967, The Hosiery & Allied Trades Research Association to be assigned to National Research Development Corporation, from which priority is claimed.

This invention relates to improvements in or relating to measuring such as, for example, measuring the speed or displacement of a running elongate member, such as, yarn, fabric or plastic sheeting, or measuring the speed of or distance travelled by, a device over a surface.

Heretofore the measuring of running yarn has been effected by the use of electrical or mechanical means, to monitor the passage of the running yarn, through the intermediary of a rotary device which has been driven by the running yarn, for which purpose the rotary device and the running yarn are arranged with frictional contact therebetween. A disadvantage of this arrangement is that friction in the pivot of the rotary device can result in increased tension in the running yarn which can undesirably decrease the travelling speed of the running yarn. Another disadvantage is that in many instances the tension and travelling speed of the running yarn can be deleteriously affected by the necessity for overcoming the inertia of the rotary device.

In order to provide sufficient driving friction between the running yarn and the rotary device, there has had to be additionally provided one or more idler wheels for guiding the running yarn into partially wrapped engagement with the rotary device, and a disadvantage is that difficulties have arisen in effecting the required engagement of the running yarn with the rotary device and the idler wheels, and friction in the pivots of the idler wheels, in addition to the friction in the pivot of the rotary device, creates additional tension in the running yarn which undesirably further reduces its travelling speed.

In many instances the travel of the running yarn is with changing velocities. For example when in a knitting machine float patterned fabric is being made, the travelling speed of the yarn can be constantly changing according to the number of needles knitting at any one time. In another example of flat bed and straight bar knitting machines, yarn is fed intermittently with rapid acceleration and deceleration of the yarn at the beginning and end of production of each course. In these instances, the use of the measuring rotary device is particularly unsatisfactory because snatching of the yarn at the beginning of each course causes undesirable slip and there are undesirably appreciable changes in yarn tension.

An object of the invention is to provide apparatus for measuring which, when used for measuring yarn, overcomes the above-mentioned disadvantages, difficulties and undesirable consequences.

The invention provides apparatus for measuring speed or displacement of an elongate member relative to another member, including means on the other member for applying a discrete electrostatic charge mark to the elongate member, a detector device on the other member and spaced from the mark applying means and for detecting an electrostatic charge mark applied by the mark applying means, and means responsive to the detection of an electrostatic charge mark for providing an output signal indicative of arrival of a charge mark at the detector device. Conveniently there is a timer for timing the interval between application and detection of a charge mark. Conveniently also the output signal is fed to the charge mark applying means to cause the charge mark applying means to apply a further charge mark upon detection of a charge mark by the detector device, the output signals being fed also to a counter whereby the displacement of the elongate member relative to the other member during a period of time may be determined. Alternatively the output signals are fed to a frequency discriminator whereby the speed of the elongate member relative to the other member may be determined.

The invention also provides a machine including forming means for forming an elongate member into a series of units of substantially uniform length, means for applying an electrostatic charge mark to the elongate member as it moves towards the forming means, a detector device spaced a predetermined distance from the mark applying means for detecting a charge mark on the elongate member as it passes the detector device, and means for counting the number of said units formed during the interval between application and detection of a charge mark. Conveniently said means for counting the number of said units comprises a member having a series of alternate light transmitting and opaque zones, the said member being movable with a moving element of said forming means, a light source at one side of the said member and a photo-cell at the other side of said member. Conveniently also the forming means is a knitting machine and the moving element with which the said member is movable is the slurcock. The distance between successive light transmitting zones is conveniently less than the distance between adjacent needles of the knitting machine.

The invention further provides a machine including means for forming an elongate member into a series of units of uniform length, means for applying an electrostatic charge mark to the elongate member as it moves towards the forming means, a detector device spaced a predetermined distance from the charge mark applying means for detecting a charge mark on the elongate member as it passes the detector device, means for producing a predetermined number of output pulse signals at a frequency related to the frequency of formation of the said units, means for causing the charge mark applying means to apply a charge mark upon production of a first output pulse signal and means for counting the number of output pulse signals produced after detection of the charge mark by the detector device whereby a discrepancy between the actual and a desired length of each of the uniform length units may be determined. Conveniently the machine includes means responsive to a discrepancy between the actual and a desired length of each of the uniform length units for correcting the discrepancy. Conveniently also said means for producing a predetermined number of output pulse signals comprises a member having a pattern of parallel alternate light transmitting and opaque zones, a light source at one side of the member and a photo-cell at the other side of the member, the member being movable with a moving element of the forming means. The machine conveniently includes means for averaging the said discrepancy over a plurality of courses of knitting.

The invention still further provides the machine or apparatus as above wherein the electrostatic charge mark applying means comprises first and second electrodes and means for generating a potential between the first and second electrodes, and the detector device includes a conductor and an amplifier electrically connected to the conductor, the arrangement being such that after passing between the first and second electrodes the elongate member may pass adjacent the conductor.

Embodiments of the present invention will now be described, by way of example, with reference to the accompanying drawings, in which:

FIG. 5 is a detail plan view of a detector device for the apparatus illustrated in FIG. 4;

FIG. 6 is a side view of the device of FIG. 5;

FIG. 7 is a view similar to FIG. 4 illustrating a fourth embodiment of the invention;

FIG. 8 is a detail view of a graticule control device incorporated in the apparatus illustrated in FIG. 7;

FIG. 9 is a diagram of an electronic circuit incorporated in the fourth embodiment; and FIG. 10 is a diagrammatic illustration of a modification of a portion of the fourth embodiment.

Figure 1:
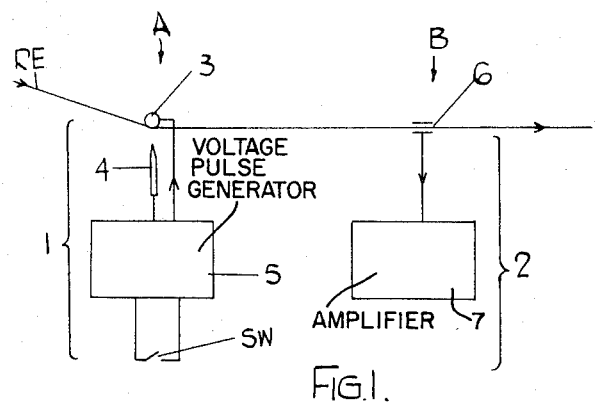
FIG. 1 is a circuit block diagram of a first embodiment of the invention for measuring of a running element.

Referring to FIG. 1, the measuring of a "running element" RE is effected by causing it to travel from one station A of an electrostatic charging device 1 to a second station B of a detector 2.

At the station A the running element travels between a pair of electrodes 3, 4 of the electrostatic charging device 1, and is in contact with, or in close proximity to, the larger, earthed electrode 3. The other electrode 4 is for example about ¼ inch away from the earthed electrode 3 and is pointed to increase the electric field. A negative pulse of three to four kilovolts and of short duration is applied to the electrode 4 from a voltage pulse generator 5 in order to produce in the running element an electrostatic charge.

Figure 2:
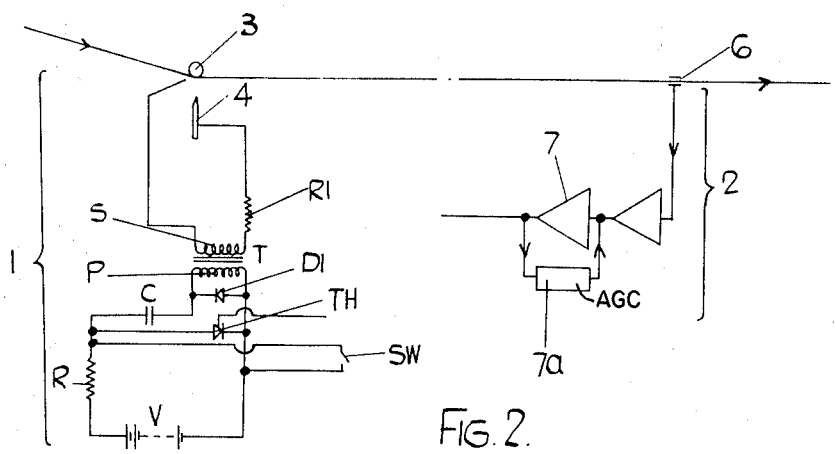
FIG. 2 is a similar view to FIG. 1 in greater detail.

In one apparatus for generating the pulse, illustrated in FIG. 2, a voltage source V continuously charges a condenser C through a resistor R. One side of the condenser C is connected to the primary P of a transformer T. The condenser C may be discharged through the transformer T by closing a switch SW or by a thyristor TH which can be triggered by electronic means. The transformer windings are such as to give a negative pulse of three to four kilovolts at the secondary S when the condenser C is discharged into the primary P. A diode D1 is connected across the primary P of the transformer T to prevent the voltage at the transformer from oscillating, thereby ensuring a uni-directional pulse at the secondary S of the transformer T. One end of the transformer secondary S is connected to the pointed electrode 4 through a resistance R1 of about ten megohms which quenches any arcing that might occur between the electrodes, and the other end of the secondary S is connected to the earthed electrode 3.

The detector 2 comprises an electric conductor 6 disposed close to and substantially encompassing the running element. For example, when the running element is a yarn, the electric conductor 6 may be a cylindrical tube of, for example, ¼" length and ¼" diameter. This tube is formed with an axially directed slit to allow the yarn to be introduced laterally into the tube, the yarn and tube being then arranged in co-axial relationship.

When the running element is a fabric the electric conductor 6 may be a pair of plates for example about ¼" square and disposed parallelly for example about ¼" apart and on opposite sides of the fabric.

When the portion of the running element which has received an electrostatic charge from the electrostatic charging device 1 travels through the electric conductor 6, the charge on the running element induces into the electric conductor 6 an opposite electrical charge.

The electric conductor 6 is connected to an electronic amplifier 7, FIG. 2, so that the electric current induced by the presence of the charge on the running element RE is amplified by the electronic amplifier 7.

The amplifier 7 incorporates an automatic gain control 7a so that although the concentration of charge remaining in the running element as it travels through the electric conductor 6 may vary, the amplified output signal from the amplifier 7 is substantially constant.

In a simple application of the embodiment of the invention illustrated in FIGS. 1, 2 the electrodes 3, 4 are spaced a known distance, e.g. three inches, from, and independent of, the electric conductor 6. The switch SW is closed manually at will and each closing of the switch serves to enter a charge into the running element. The time for this charge to reach the detector can be measured by a known form of interval timer whose output is taken to a meter which is scaled to read in travelling speed of the yarn.

Figure 3:
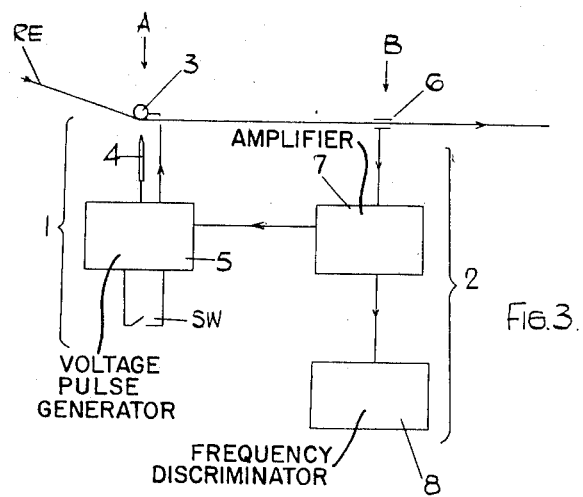
FIG. 3 is a view similar to FIG. 1 illustrating a second embodiment for measuring yarn.

In the embodiment illustrated in FIG. 3, the electric amplifier 7, 7a is connected to the thyristor TH of the electrostatic charging device 1, so that, with the electrodes 3, 4 and the conductor 6 spaced a known distance apart, e.g. three inches, the voltage pulse generator is first triggered by the manually operated switch SW to enter a charge into the running element. When the charge is detected by the detector 2, the detector 2 generates a signal which is amplified and the amplified signal is used to trigger the voltage pulse generator through the intermediary of the thyristor TH, so that a charge is entered into the running element at a location spaced a predetermined distance, e.g. said three inches, from the first charge. This sequence is thereafter repeated automatically.

Because the time lag between the detection of a charge and the entering of another charge is negligible in the present context, the interval between signals from the detector may be considered to be the time taken for travel of the predetermined length of the running element, e.g. the said three inches, from the electrostatic charging device 1 to the detector 2.

The amplified output signals from the amplifier 7, 7a are passed to an electric counter 8, see FIG. 3, by which the signals are counted for a known period of time, whereby the length of running element which has passed in the period of time, and hence the average speed of the running element may be determined. Alternatively the signals are passed to a frequency discriminator 8a which provides an accurate indication of the travelling speed of the running element.

In another application of the invention the running element is a yarn being fed in a knitting machine which forms the yarn into a series of units of uniform length, i.e.

stitches, the object being to find out the average stitch length of the fabric through the medium of measuring the amount of yarn consumed per needle.

In the examples to be hereinafter described, the knitting machine is of straight bar knitting machine type wherein the travel of the yarn is intermittent since it starts and stops at the beginning and end of production of each course. However it is to be understood that the invention is also applicable to other knitting machines whether or not the travelling speed of the yarn varies.

Figure 4:
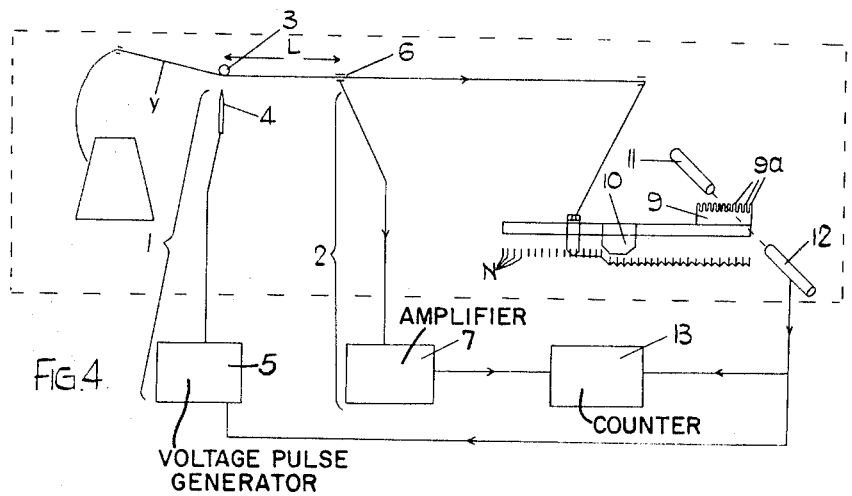
FIG. 4 is a view similar to FIG. 1 illustrating a third embodiment.

Referring to FIG. 4, the electrodes 3, 4 and the electric conductor 6 are disposed a predetermined distance apart so that the length of yarn Y extending between them is of known length L. In principle, the entering of an electrostatic charge into the yarn is used to instigate operation of a counter to start counting the number of needles to which yarn is being fed, and the detection of the charge is used to stop the counting so that the resultant count is an indication of the number of needles that have knitted the length L of the yarn, and from this there can be calculated the average stitch length.

In a specific arrangement, a control member 9 is traversible in predetermined relation to, for example, the slur mechanism of the machine as represented by attachment of the control member 9 to the indicated slurcock 10. The control member 9 has parallel slits 9a spaced in predetermined relation to the pitch spacing of the needles N. At one side of the control member 9 is a transducer lamp 11 and at the other side is a photo-electric cell 12 which is electrically connected to a counter 13 having an indicating dial or meter 14 and to the voltage pulse generator 5. The counter 13 and indicating dial or meter 14 are also electrically connected to the electronic amplifier 7. The control member 9 moves repeatedly with, in this instance, the slurcock 10, and each time that an electrostatic charge is entered into the yarn Y the lamp 11 and photo-cell 12 are rendered live so that each time a slit 9a in the control member 9 allows the light beam to pass to the photo-cell 12, of the counter 13 is caused to count. Counting continues until the electrostatic charge is detected by the detector 2 which then causes cutting out of the lamp 11 and photo-cell 12 to stop the counting. The dial or meter 14 then displays a number which is in predetermined relation to the number of needles N which have taken the length L of the yarn Y and from this the average stitch length is readily calculable.

Since the number of needles N taking the length L of yarn may be small, the accuracy of the measuring may be increased by having the pitch spacing of the slits 9a several times, for example in the ratio four to one, smaller than the pitch spacing of the needles N. Consequently for each needle pitch space, several, for example, four, of the slits 9a will pass the light beam thereby causing the counter 13 to count several times, for example, four, for each needle N.

By this means the indicated number can be to an accuracy of a fractional part of a stitch knitted by the length of yarn L, for example to an accuracy of ¼ of a stitch.

In one example, as applied to a fully fashioned straight bar knitting machine, the apparatus detects and displays any deviation from the desired stitch length. The apparatus consists of three main units as follows:

(a) A transducer head 15, FIGS. 5, 6 having the electrostatic marking electrodes 3, 4, and the electric conductor 6 at an adjustable distance from it.

(b) The graticule control member 9, FIGS. 7, 8 attached to the slur bar 10a of the knitting machine and arranged to interrupt the light beam between the transducer lamp 11 and the photo-cell 12.

(c) An electronic unit 16, FIGS. 7, 9, 10, to process the information from the transducer head 15 and the photo-cell 12 and produce a display of stitch length error.

The transducer head 15, FIGS. 5, 6, is of portable form adapted for application to different yarns of different knitting sections of the machine, in turn. It may be held by the hand, or it may be, say by clip means, removably fitted in jigged positions in the respective sections. The head comprises a U-shaped bracket 17 having openended slots in its end walls in which are fitted C-shaped eyelets 18 which are smoothly contoured to prevent abrasion of the yarn and through which, by application of the device to yarn laterally thereof, the yarn can run. The electrodes 3, 4 are so mounted from the main wall 17a of the bracket 17 that they are disposed at opposite sides of the applied yarn. The charge detector 6 has a side slit also for lateral introduction of the yarn, and it is mounted on a screw nut 19 which is carried by an adjusting screw 20 mounted in an end wall of the bracket 17 and in a bracket 21. The screw nut 19 carries a pointer 22 co-operating with a fixed scale 22a whereof the graduations are in predetermined relation to stitch length. The bracket 17 is made of insulating material, or is otherwise insulated from the electrodes. The screw nut 19 is also of insulating material and is held against rotation by co-operation with the main wall 17a over which it may slide.

The transducer lamp 11 and photo-cell 12 are secured by suitable means to a frame part of the machine in the region of the centre of a section of the machine.

The graticule 9, FIG. 8, is conveniently provided by a rectangular portion of a photographic negative having, for example, a horizontal length of 1½ inches and a height of half an inch. The negative exhibits a series of horizontally spaced vertical lines or bars which are in the order of 10 thousandths of an inch thick and similarly equally spaced. This negative is conveniently stuck by adhesive to a backing of transparent plastic sheet 23 of suitably greater dimensions allowing it to be fixed by screws 24 to the slur bar 10a or to an element moving linearly therewith.

The principle of operation is as follows, with reference being made, in particular, to FIG. 7.

The graticule 9 is arranged to interrupt the light beam to the photo-cell 12 near the centre of a knitted course and upon movement of the slur bar 10a provides a series of pulses from the photo-cell 12 the first of which triggers the voltage pulse generator 5, provided in the electronic unit 16, to put a charge on the yarn.

The distance between the charging station and the detection station is adjustable by the screw 20. FIGS. 5, 6, and is initially adjusted to a graduation mark on the transducer head 15 corresponding to the particular stitch length required to be knitted on the machine.

With the length and number of bars of the graticule 9 known, it can be arranged that the electrostatic charge on the yarn will pass the detector 6, when stitches of correct length are being formed, with a known number of bars of the graticule 9 still to interrupt the light beam.

It is arranged, by means hereinafter described with reference to FIG. 9, for the detection of the charge to cause a counter in the electronic unit 16 to count the remaining number of bars to pass through the light beam and actuate in this instance a display milli-ammeter initially showing zero error in the stitch length.

If the consumption of yarn by the machine is greater than desired, the charge on the yarn will pass the detector 6 early, that is, before the predetermined number of graticule bars, appropriate for stitches of correct length, have passed the photo-cell 12, and a greater number of bars will be counted, giving a display by the milli-ammeter showing positive error. Similarly, if the yarn consumption is lower than desired, the slur bar 10a and graticule 9 will have travelled further if appropriate when stitches of correct length are being formed, by the time the charge on the yarn reaches the detector 6, and less bars will be counted giving a negative error display by the milli-ammeter.

The counter pulses may be used to adjust quality control mechanism of the machine section to which the transduced head 15 is applied, to automatically correct the stitch length of the section. For example, see FIG. 10, an error signal from the milli-ammeter may be passed through an amplifier 25a to an electric motor 25 which is connected through a gear box GB to an adjusting screw 26 of the quality control mechanism.

The amplifier 25a is normally inoperative but is made operative for a short interval of time at the end of a complete count by the action of a flip-flop FF which is triggered from the last stage of the course counter CC. The period of operation of the amplifier 25a is such as to allow the motor 25 to turn the quality control screw 26 by an amount approximately equivalent to say 1% change in stitch length when the milli-ammeter shows an error.

It has been found that there are several factors in the actual behaviour of a yarn in the machine which need to be taken into account. The several factors are:

(a) The yarn movement into the knitting machine tends to be jerky, due to the elasticity of the yarn and the friction applied to it in the tensioners.

(b) An occasional short length of yarn may not retain the charge which is put upon it for sufficient time for the charged yarn to reach the detector.

(c) A large charge in induced into some yarns, by the tensioner at the start of a course. The jerky movement of the yarn can produce an error of measurement during one course of knitting, and in order to overcome this error, it is arranged to measure over a number of courses, say eight, and average out. It is also arranged that if a charge is not detected on the yarn during a particular course, that course is not counted as one of the eight. Further, the detector amplifier 7 has to be desensitized except during the relevant part of the course so that a false signal is ignored. The circuit illustrated in FIG. 9 provides these operational features.

The electronic unit 16, FIG. 9, includes an amplifier 12a connected to the photo-cell 12, and the aforesaid voltage pulse generator 5 with an associated thyristor trigger amplifier 5a. The gain of the signal amplifier 7, whose input is connected to the detector 6, is controlled by the automatic gain control circuit 7a, and a signal gate 7b coupled to the photo-electric cell 12. The output of the amplifier 7 is connected by a signal shaper 7c to a bistable flip-flop 7d. A course counter CC receives pulses by way of the circuits 7 and 7a from the electric conductor 6 as electrostatic charges are detected. A pulse amplifier 7e is coupled to the output of the bistable flip-flop 7d and passes pulses from the photo-cell 12 to an error counter EC.

The counters CC, EC consist of series of bistable divided-by-two elements.

The signal shaper 7c has first and second transistors T1, T2, and a Zener diode Z biases the base of the second transistor T2 so as to ensure that only large negative going signals of amplitude greater than about 2 volts will pass through the flip-flop 7d.

The signal gate 7b which determines whether pulses from the detector 6 are amplified by the amplifier 7 is basically a diode, the gate diode GD, whose resistance is varied by the presence or absence of current flow. The output of the first stage of the amplifier 7 is connected through the gate diode GD to the negative supply rail NSR. With no current flowing through the diode, the diode will be of high resistance and the output signal of this first stage will be unaffected thereby; when a current is caused to flow through the diode, its resistance will be low and the output signal will be shorted to earth.

The gate diode GD is connected via a 10KΩ resistor R2 and a Zener diode ZD to the output of the photo-cell amplifier 12a, which, unless the graticule 9 is passing the photo-cell 12, applies a positive voltage to the diode GD causing it to carry a current. When the graticule 9 is passing the photo-cell 12, the photo-cell amplifier output alternates between positive and negative, and during this period a diode D1 across the 10KΩ resistor R2 allows a 0.1 μf. condenser C1 to charge so that the voltage across the Zener diode ZD is not sufficient to allow significant current to flow through the gate diode GD.

The gate diode GD is also connected via a 10KΩ resistor R3 and a Zener diode ZD1 to one output of the last bistable in the course counter CC. This output is arranged to be negative during a measurement, but to become positive when eight pulses have passed into the course counter CC. As long as this bistable output is negative or near negative, the Zener diode ZD1 will prevent current being passed from this counter through the gate diode GD. When the bistable output becomes positive at the end of a measurement, current will flow through the gate diode GD, shorting the signal to earth.

A measurement is started by momentarily pressing a reset switch which is connected, in a known manner for counters, to all bistables in the course and error counters CC, EC for operation to reset the counters to neutral or zero state.

Each time that the graticule 9 interrupts the light beam to the photo-cell 12, a series of electrical pulses corresponding to the bars of the graticule 9 are generated by the photo-cell 12. These pulses are amplified by the amplifier 12a and passed to the thyristor trigger amplifier 5a, the first pulse then triggers the voltage pulse generator 5 to cause a charge to be put on the yarn. The voltage pulse generator 5 will be similarly triggered by each succeeding pulse from the photo-cell 12, but the charge condenser will not have had sufficient time to charge up and no marking charge will be put onto the yarn.

The output from the photo-cell amplifier 12a to the signal gate 7b shorts any detected signals from the detector 6 to earth unless pulses are received from the photo-cell due to the presence and movement of the graticule 9.

When the portion of yarn charged by the voltage pulse generator 5 reaches the detector 6, a current pulse is induced in the detector 6. This pulse is amplified, provided that the diode GD is not conducting, to a known level by the action of the signal amplifier 7 and automatic gain control 7a, and then passes through the shaping network 7c to the flip-flop 7d.

The purpose of the bistable flip-flop 7d is twofold (a) it pulses the course counter CC to register that one course has been measured, (b) it controls the pulse amplifier 7e and allows pulses from the photo-cell amplifier 12a, which are generated after each charge on the yarn has been detected, to be passed to the error counter EC which has seven divide-by-two bistables in series.

The sequence of charging a portion of the yarn and counting pulses from the photo-cell after the charge has reached the detector, automatically repeats until eight courses have been counted by the course counter CC, when the last bistable in the course counter CC actuates the signal gate 7b to short the detected signal to earth.

A milli-ammeter M is connected to the outputs of the four most significant of the bistable elements in the error counter EC, as shown in the diagram. With this error counter EC reset to zero, all the left hand output resistors C3–C7 of the bistables will be conducting and the lower end (as shown in FIG. 9) of the resistors will be near earth potential. Conversely the right hand output resistors will not be conducting, and their lower ends will be at full supply potential. There will thus be a current, denoted by I, to the left hand resistor of the stage B7 through the milli-ammeter M, contributed by the bistable stages in the following proportions due to the resistance of coupling resistors N3 to N6.

Stages:
3 ---------------------------------------- $I/15$
4 ---------------------------------------- $2I/15$
5 ---------------------------------------- $4I/15$
6 ---------------------------------------- $8I/15$ The current through the milli-ammeter M will increase positively by $I/15$ for every fourth pulse entering the counter to give a current as follows, as the voltages at the lower ends of the resistors N3 to N6 fall to zero one by one:

Pulses:
- 4th _____ $14I/15$
- 8th _____ $13I/15$
- 12th _____ $12I/15$
- and so on to
- 64th _____ 0

On the 68th pulse, the voltage at the lower end of the right hand output resistors of bistables B3, B4, B5, and B6 will rise to the supply voltage again but the voltage at the bottom end of the left hand output resistor of bistable B7 will also have risen to the supply voltage. Hence the current through the mill-ammeter M will therefore again be zero. After the next four pulses a current $I/15$ will flow in the milli-ammeter M in the reverse direction to that which flowed before the 64th pulse. For every fourth succeeding pulse thereafter, up to the 124th, the current will increase in $I/15$ steps as the voltage of the lower ends of the right hand resistors fall to zero.

With the correct spacing of the charger electrodes 3, 4 and the detector 6 in the transducer, and the correct spacing and number of bars in the graticule 9, it can be arranged that an average of 8 to 8½ bars on the graticule 9 for each of the eight courses, i.e. a total of 64 to 68 counts, is representative of the correct stitch length. Also each bar on the graticule 9 can correspond to a 2% change in stitch length so that each increment of movement on the milli-ammeter M corresponds to 1% change of stitch length, except at the zero position. With the centre-zero milli-ammeter M, the error in the stitch length can be displayed up to ±14% error.

Consequently any errors of stitch length occurring in each course and which are signalled from the graticule and photo-cell to the error counter in the form of a number greater or less than 8½, and these numbers for the respective courses are added together in the error counter so that the final output number is greater or less than the 64 required for the milli-ammeter M to give a zero reading and accordingly the actual reading will be of a plus or minus error of a value in predetermined relation to the difference between the final output number and 64.

At the zero position, because the current does not change at the 68th count, then a dead stage will exist for an extra 1% of stitch length change. This dead stage would be an advantage for automatic use to prevent hunting and may also be an advantage with a visual display to cause the operator to neglect small changes in stitch length. However, if a dead space is not desirable for any reason, it can be overcome by connecting an extra resistor to a tapping on the power supply, as shown dotted in the diagram.

Although a major part of the foregoing particular description is concerned with application of the invention to running yarn in a straight bar knitting machine it is to be understood that the invention is also applicable to, for example, other materials, e.g. fabric, or plastic sheeting, and to other machines such as flat bed knitting machines.

Whilst in the above specific description, the elongate member, for example, the yarn, is the moving element and the measuring apparatus is stationary, it is to be understood that the elongate member could be stationary and apparatus in accordance with the present invention could be carried by a member, for example, a vehicle moving over the elongate member. Such an arrangement would have advantages in measuring the speed or displacement of a vehicle moving over a surface between which and the vehicle there is no contact.

What we claim is:

1. A machine including forming means for forming an elongate member into a series of units of substantially uniform length, means for applying an electrostatic charge mark to the elongate member as it moves towards the forming means, a detector device spaced a predetermined distance from the mark applying means for detecting a charge mark on the elongate member as it passes the detector device, and means for counting the number of said units formed during the interval between application and detection of a charge mark.

2. A machine as claimed in claim 1, wherein the said means for counting the number of said units comprises a member having a series of alternate light transmitting and opaque zones, said forming means including a moving element, the said member being movable with the moving element of said forming means, a light source at one side of the said member and a photo-cell at the other side of said member.

3. A machine as claimed in claim 1, wherein the forming means is a knitting machine and the moving element with which a said member is movable is the slurcock.

4. A machine as claimed in claim 1, wherein said means for counting the number of said units comprises a member having a series of alternate light transmitting and opaque zones, said forming means including a moving element, the said member being movable with said moving element of said forming means, a light source at one side of the said member and a photo-cell at the other side of said member, and the distance between successive light transmitting zones being less than the distance between adjacent needles of the knitting machine.

5. A machine including means for forming an elongate member into a series of units of uniform length, means for applying an electrostatic charge mark to the elongate member as it moves towards the forming means, a detector device spaced a predetermined distance from the charge mark applying means for detecting a charge mark on the elongate member as it passes the detector device, means for producing a predetermined number of output pulse signals at a frequency related to the frequency of formation of the said units, means for causing the charge mark applying means to apply a charge mark upon production of a first output pulse signal and means for counting the number of output pulse signals produced after detection of the charge mark by the detector device whereby a discrepancy between the actual and a desired length of each of the uniform length units may be determined.

6. A machine as claimed in claim 5 wherein the means for counting the number of output pulse signals includes a counter comprising a plurality of bistable stages, each stage having corresponding first and second output terminals, and means provided for generating an error signal comprising a series of resistors the resistances of which form a decreasing geometric progression, successive resistors of the series being coupled to the first output terminals of successive stages of increasing significance but not to the most significant stage, the error signal being, in operation, taken between a common connection to the resistors, at the ends thereof remote from the counter stages, and the second output terminal of the most significant stage, and the arrangement being such that the error signal decreases in one sense with pulse signals counted until the most significant stage changes its state and thereafter increases in the opposite sense.

7. Apparatus as claimed in claim 5 including a further counter operatively associated for counting pulses generated by the detector device when charge marks are detected, means for preventing the said output signal pulses from reaching the other counter, and the most significant state of the further counter being coupled to said means for preventing the said output signal pulses from reaching the other counter, whereby, when the further counter reaches its maximum count, the error signal generated is representative of the total of the discrepancies between the actual and the desired lengths of a number of the said units.

8. A machine as claimed in claim 5 including means responsive to a discrepancy between the actual and a desired length of each of the uniform length units.

9. A machine as claimed in claim 5 wherein the said means for producing a predetermined number of output pulse signals comprises a member having a pattern of parallel alternate light transmitting and opaque zones, a light source at one side of the member and a photo-cell at the other side of the member, said forming means including a moving element, the member being movable with said moving element of the forming means.

10. A machine as claimed in claim 5 wherein the forming means is a knitting machine and the said member is movable with the slurcock.

11. A machine as claimed in claim 5 including means for averaging the said discrepancy over a plurality of courses of knitting.

12. A machine or apparatus as claimed in claim 5, wherein the electrostatic charge mark applying means comprises first and second electrodes, and means for generating a potential between the first and second electrodes, and wherein the detector device includes a conductor and an amplifier electrically connected to the conductor, the arrangement being such that after passing between the first and second electrodes the elongate member may pass adjacent the conductor.

13. In a knitting machine having stitch-forming means for forming a yarn into a series of stitches of substantially uniform yarn length, means operative to apply an electrostatic charge mark to the yarn as it moves towards said stitch-forming means, a detector device spaced a predetermined distance from said mark applying means for detecting a charge mark on the yarn as it passes the detector device and means operative to count the number of stitches formed during the time interval between application and detection of a charge mark.

14. In a knitting machine according to claim 13 said stitch-forming means including a moving element, said means operative to count the number of stitches including a member having a series of alternative light transmitting and opaque zones and operative to move with said moving element, a stationary light source at one side of said member and a stationary photo-cell at the other side of said member.

15. In a knitting machine according to claim 14, said moving element being a slurcock.

16. In a knitting machine according to claim 14, wherein said stitch-forming means includes a plurality of needles, the distance between successive light transmitting zones of said member being less than the distance between adjacent needles.

17. In a knitting machine having stitch-forming means for forming a yarn into a series of stitches of substantially uniform length, means operative to apply an electrostatic charge mark to the yarn as it moves towards said stitch-forming means, a detector device spaced a predetermined distance from said mark applying means and operative to detect a charge mark on the yarn as it passes the detector device, means operative to produce a predetermined number of output pulse signals at a frequency related to the frequency of formation of the stitches means operative to cause said charge mark applying means to apply a charge mark upon production of the first of said output pulse signals and means operative to count the number of output pulse signals produced after detection of the charge mark by said detector device whereby a discrepancy between the actual and a desired length of the stitches may be determined.

18. In a knitting machine according to claim 17, said means operative to count the number of output pulse signals produced after detection of the charge mark includes a counter having a plurality of bistable stages, each of said bistable stages having corresponding first and second output terminals, and means operative to generate an error signal and including a series of resistors the resistances of which form a decreasing geometric progression, successive resistors of said series being coupled to said first output terminals of successive stages of increasing significance but not to the most significant stage, said resistors having a common connection at the ends thereof remote from said counter bistable stages, and means operative to take said error signal between said common connection and the second output terminal of said most significant stage, the arrangement being such that said error signal decreases in one sense with pulse signals counted until said most significant stage changes its state and thereafter increases in the opposite sense.

19. In a knitting machine according to claim 17, a further counter operative to count detection of charge marks, by said detector device, means operative to prevent said output pulse signals from reaching the first-mentioned counter, the most significant stage of said further counter being coupled to said means operative to prevent said output pulse signals from reaching the first-mentioned counter, whereby, when said further counter reaches its maximum count, the error signal generated is representative of the total of the discrepancies between the actual and the desired lengths of a number of said stitches.

20. In a knitting machine according to claim 17, means responsive to said discrepancy between the actual and a desired length of each of the stitches and operative to create a correction tending to reduce the discrepancy in subsequently formed stitches.

21. In a knitting machine according to claim 17, said means operative to produce a predetermined number of output pulse signals includes a member having a pattern of parallel alternate light transmitting and opaque zones, a stationary light source at one side of said member, a stationary photo-cell at the other side of said member, said stitch-forming means including a movable element, said member being movable with said movable element.

22. In a knitting machine according to claim 21, said movable element including a slurcock.

23. In a knitting machine according to claim 17 means operative to average said discrepancy over a plurality of courses of knitting.

24. Machine, for fabricating an elongate member, including in combination, fabricating devices for fabricating said elongate member into a series of interconnecting units comprising substantially uniform lengths of said elongate member, means in operative relationship for causing said elongate member to travel in a path to said fabricating devices, means operatively associated with said fabricating devices for operating said fabricating devices to fabricate said elongate member, a marking element operably disposed adjacent a first part of said path away from said fabricating devices for applying a mark to said elongate member during its travel, a mark detector element operably disposed adjacent a second part of said path spaced from said first part towards said fabricating devices for detecting said mark of said elongate member, and responsive means in operative relationship to be influenced by operations of said devices and elements to give a usable response which is dependent on the number of said fabricating devices which fabricate said elongate member during the time interval between said mark being applied to said elongate member and said detecting of said mark.

25. Machine for stitch forming with an elongate member, including in combination, stitch forming devices for forming said elongate member into a series of interconnecting stitches comprising substantially uniform lengths of said elongate member, means in operative relationship for causing said elongate member to travel in a path to said stitch forming devices, means in operative relationship for operating said stitch forming devices to form said stitches, a marking element operably disposed adjacent a first part of said path away from said stitch forming devices for applying a mark to said elongate member during its travel, a mark detector element operably disposed adjacent a second part of said path spaced from said first part towards said stitch forming devices for detecting said mark of said elongate member, and responsive means in operative relationship to be influenced by operations of said devices and elements to give a usable response which is dependent on the number of said stitch forming devices which form stitches during the time interval between said mark being applied to said elongate member and said detecting of said mark.

26. Knitting machine for producing knitting fabric from yarn, including in combination, loop-forming devices for forming series of interconnected loops of substantially uniform size, means in operative relationship for causing said yarn to travel in a path to said loop-forming devices, means in operative relationship for operating said loop-forming devices to form knitted fabric, an electrostatic charge marking element operably disposed adjacent a first part of said path away from said loop-forming devices for applying a mark to said yarn during its travel, an electrostatic charge marking detector element operably disposed adjacent a second part of said path spaced from said first part towards said loop-forming devices for detecting said mark in said yarn, and responsive means in operative relationship to be influenced by operations of said devices and elements to give a usable response which is dependent on the number of said loop-forming devices which form loops during the time interval between said mark being applied to said yarn and said detecting of said mark.

References Cited

UNITED STATES PATENTS

| | | | |
|---|---|---|---|
| 2,220,807 | 11/1940 | Stout et al. | 66—82 |
| 2,603,688 | 7/1952 | Cole et al. | 324—70 |
| 2,989,690 | 6/1961 | Cook | 324—70 |
| 3,303,419 | 2/1967 | Gith | 324—71 |
| 3,382,368 | 5/1968 | Conner et al. | 250—219 |

ARCHIE R. BORCHELT, Primary Examiner

T. N. GRIGSBY, Assistant Examiner

U.S. Cl. X.R.

66—110; 250—214; 324—70